United States Patent
Ebeling et al.

(10) Patent No.: US 9,679,546 B2
(45) Date of Patent: Jun. 13, 2017

(54) SOUND VEST

(71) Applicant: Not Impossible LLC, Venice, CA (US)

(72) Inventors: Mick Ebeling, Venice, CA (US); David Francis Putrino, New York, NY (US); Daniel Biscaro Loureiro, New York, NY (US); Patrick Hanlon, Brooklyn, NY (US)

(*) Notice: Subject to any disclaimer, the term of this patent is extended or adjusted under 35 U.S.C. 154(b) by 0 days.

(21) Appl. No.: 14/713,908

(22) Filed: May 15, 2015

(65) Prior Publication Data

US 2015/0332659 A1 Nov. 19, 2015

Related U.S. Application Data

(60) Provisional application No. 61/994,753, filed on May 16, 2014.

(51) Int. Cl.
*G10H 1/00* (2006.01)
*G09B 19/00* (2006.01)
(Continued)

(52) U.S. Cl.
CPC ............... *G10H 1/00* (2013.01); *G08B 6/00* (2013.01); *G09B 15/02* (2013.01); *G09B 19/00* (2013.01); *G09B 19/0015* (2013.01); *G09B 19/0038* (2013.01); *G09B 21/009* (2013.01); *G10H 1/0033* (2013.01); *G10H 1/0066* (2013.01); *G10H 1/045* (2013.01); *H04R 5/02* (2013.01);
(Continued)

(58) Field of Classification Search
CPC .. G10H 1/0033; G09B 19/00; G09B 19/0038; G09B 19/0015; G09B 15/02

USPC ................................. 84/645, 470 R; 381/333
See application file for complete search history.

(56) References Cited

U.S. PATENT DOCUMENTS 5,290,964 A * 3/1994 Hiyoshi ................. G06F 3/014
84/600
5,314,403 A * 5/1994 Shaw ................ A61H 23/0236
297/217.1

(Continued)

FOREIGN PATENT DOCUMENTS

WO  WO 2006/130559 A2  12/2006
WO  WO 2010/033086 A1  3/2010

OTHER PUBLICATIONS

"Woojer, the Wearable Audio Accessory That Lets You Feel the Sound"; Wearable Tech; http://www.wearabletechworld.com/topics/wearable-tech/articles; Nov. 21, 2013; accessed May 15, 2015; 2 pages.

(Continued)

*Primary Examiner* — David Warren
*Assistant Examiner* — Christina Schreiber
(74) *Attorney, Agent, or Firm* — Barcelo, Harrison & Walker, LLP

(57) ABSTRACT

Vibratory motors are used to generate a haptic language for music or other sound that is integrated into wearable technology. The disclosed system enables the creation of a family of devices that allow people with hearing impairments to experience sounds such as music or other auditory input to the system. For example, a "sound vest" transforms musical input to haptic signals so that users can experience their favorite music in a unique way, and can also recognize auditory cues in the user's everyday environment and convey this information to the user using haptic signals.

4 Claims, 3 Drawing Sheets

(51) Int. Cl.

| | | |
|---|---|---|
| G09B 15/02 | (2006.01) | |
| G09B 21/00 | (2006.01) | |
| G08B 6/00 | (2006.01) | |
| H04R 5/02 | (2006.01) | |
| G10H 1/045 | (2006.01) | |

(52) U.S. Cl.
CPC . *G10H 2210/056* (2013.01); *G10H 2220/321* (2013.01)

(56) References Cited

U.S. PATENT DOCUMENTS

| | | | | |
|---|---|---|---|---|
| 5,368,359 | A * | 11/1994 | Eakin | A61H 23/0236 297/184.14 |
| 5,553,148 | A * | 9/1996 | Werle | H04R 5/023 381/151 |
| 7,035,422 | B1 * | 4/2006 | Wiener | H04R 1/025 381/301 |
| 8,144,911 | B2 * | 3/2012 | Chiang | H04R 19/013 381/172 |
| 8,343,066 | B1 | 1/2013 | Eagleman et al. | |
| 8,582,789 | B2 * | 11/2013 | Cheung | H04S 1/00 381/313 |
| 2003/0206642 | A1 * | 11/2003 | Menzies | H04R 5/023 381/333 |
| 2005/0113167 | A1 * | 5/2005 | Buchner | A63F 13/02 463/30 |
| 2008/0143080 | A1 * | 6/2008 | Burr | D04B 1/14 280/495 |
| 2009/0131165 | A1 * | 5/2009 | Buchner | A63F 13/02 463/30 |
| 2009/0262967 | A1 * | 10/2009 | Bryan | H04R 5/02 381/333 |
| 2009/0270758 | A1 | 10/2009 | Eagleman et al. | |
| 2011/0046687 | A1 * | 2/2011 | Naschberger | A61H 23/00 607/3 |
| 2012/0260789 | A1 * | 10/2012 | Ur | G09B 19/0038 84/470 R |
| 2014/0005579 | A1 * | 1/2014 | Drlik | A61H 23/0218 601/111 |
| 2014/0012167 | A1 * | 1/2014 | DeVlieger | A61H 23/02 601/111 |
| 2014/0070957 | A1 * | 3/2014 | Longinotti-Buitoni | A61B 5/6804 340/870.01 |
| 2014/0318699 | A1 * | 10/2014 | Longinotti-Buitoni | A61B 5/0002 156/247 |
| 2015/0062959 | A1 * | 3/2015 | Wilson | H05B 33/0803 362/570 |
| 2015/0097719 | A1 * | 4/2015 | Balachandreswaran | G01B 11/002 342/147 |
| 2015/0161908 | A1 * | 6/2015 | Ur | G09B 19/0038 84/470 R |
| 2015/0177939 | A1 * | 6/2015 | Anderson | G06F 21/35 715/745 |
| 2015/0217121 | A1 * | 8/2015 | Subramanian | A61N 1/3968 607/4 |
| 2015/0289034 | A1 * | 10/2015 | Engman | G09F 27/00 340/870.07 |
| 2015/0293590 | A1 * | 10/2015 | Lehtiniemi | G06F 3/016 715/702 |
| 2015/0317910 | A1 * | 11/2015 | Daniels | G09B 21/00 84/485 R |
| 2015/0324646 | A1 * | 11/2015 | Kimia | G06T 7/0018 348/62 |
| 2015/0331488 | A1 * | 11/2015 | Grant | G06F 3/011 715/702 |
| 2015/0332659 | A1 * | 11/2015 | Ebeling | G09B 19/0015 84/645 |
| 2015/0356889 | A1 | 12/2015 | Schwartz | |
| 2015/0366504 | A1 * | 12/2015 | Connor | A61B 5/6804 600/301 |
| 2016/0027338 | A1 * | 1/2016 | Ebeling | G10H 1/00 340/4.12 |
| 2016/0030854 | A1 * | 2/2016 | Shaanti | A63H 33/042 446/85 |
| 2016/0133151 | A1 * | 5/2016 | O'Dowd | G06F 3/011 434/236 |

OTHER PUBLICATIONS

"Woojer—Feel the Sound!"; Kickstarter, Inc.; https://www.kickstarter.com/projects; 2015; accessed May 15, 2015; 10 pages.

Saba et al.; "Hey yaa: A Haptic Warning Wearable to Support Deaf People Communiction"; Collaboration and Technology; 2011; vol. 6969; p. 215-223.

"ButtKicker Gamer 2 for Simulation and Gaming"; The Guitammer Company; http://www.thebuttkicker.com/gaming/; 2011; accessed May 15, 2015; 3 pages.

Yi Yang; "Design and Control of an Integrated Haptic Interface for Touch Screen Applications"; Thesis presented in the application to obtain the Doctorate degree in Science of the University of Lille; Nov. 2013; pp. 185; France.

Abstract of Hayes, L. et al.; "Imposing a Networked Vibrotactile Communication System for Improvisational Suggestion"; Organized Sound; Apr. 2012; pp. 36-44; vol. 17, Issue 1.

Dr. Stefano Papetti; "AHM Audio-Haptic modalities in Musical Interfaces"; Institute for Computer Music and Sound Technology; Mar. 1, 2014; Zürich, Switzerland; downloaded Dec. 18, 2015 from https://www.zhdk.ch/index.php?id=icst_ahmi_e.

Jacob Siegal; "Good Vibrations: A Musical Glove That Improves Motor Skills"; PCWorld; Jul. 17, 2012; downloaded Dec. 17, 2015 from http://www.pcworld.com/article/259417/good_vibrations_a_musical_glove_that_improves_motor_skills.html.

Merlo, J.L, et al.; "Communicating Through the Use of Vibrotactile Displays for Dismounted and Mounted Soldiers"; 25th Army Science Conference; Nov. 2006; pp. 7; Orlando, FL.

McGuire, J. et al,; "Vibrotactile Device for Optimizing Skin Response to Vibration"; UW-BEM Design; Oct. 26, 2011; pp. 25; Madison, WI; downloaded Mar. 3, 2016 from http://bmedesign.engr.wisc.edu/projects/file/?fid=2148.

Good, A.; "Compensatory Plasticity in the Deaf Brain: Effects on Perception of Music"; 2014; Brain Sci; pp. 560-574; vol. 4.

Hoggan, E. et al.; "Audio or tactile feedback: which modality when?"; CHI'09 Proceedings of the SIGCHI Conference on Human Factors in Computing Systems; Apr. 9, 2009; pp. 2253-2256; New York, NY, USA.

Speaker allows deaf to feel music. Story from BBC News; Oct. 26, 2015; downloaded Dec. 17, 2015 from http://news,bbc.co.uk/go/pr/fr/-/2/hi/uk_news/england/london/4377428.stm.

Carmen Branje; "Feeling the Music: Vibrotactile music is the latest example of technology enabling the emergence of new art forms."; Jul. 15, 2011.

Miga Motor Company; "DM01 Linear Shape Memory Alloy Actuator with Basic Stamp Microcontroller Kit"; Miga Motors; Mar. 1, 2007; downloaded Mar. 29, 2016 from http://www.migamotors.com/Media/DM01-BOE-App-Notes. pdf.

Choi, S. et al.; "Vibrotactile Display: Perception, Technology, and Applications"; Proc. IEEE; Sep. 2013; pp. 2093-2104; vol. 101, No. 9.

Yong, G. et al.; "Audio-Tactile Glove"; Proc. of the 16th Int. Conference on Digital Audio Effects (DAFx-13); Sep. 2-5, 2013; pp. 1-5; Maynooth, Ireland.

Hakon Knutzen; "Haptics in the Air—Exploring Vibrotactile Feedback for Digital Musical Instruments with Open Air Controllers"; Department of Musicology University of Oslo; Oct. 2013; pp. 1-106; Oslo Norway.

Mario Enriquez; "A Study of Haptic Icons"; The Faculty of Graduate Studies Department of Computer Science University of British Columbia; Oct. 2002; pp. 1-88; Vancouver, British Columbia, Canada.

Van Der Linden, J. et al.; "MusicJacket—Combining Motion Capture and Vibrotactile Feedback to Teach Violin Bowing"; IEEE T Instrum Meas; Jan. 2011; pp. 1-10; vol. 60; Issue: 1.

(56) References Cited

OTHER PUBLICATIONS

Inwook Hwang; "Perceptual Analysis of Vibrotactile Stimuli and Its Application to Vibrotactile Rendering of Music"; Department of Computer Science and Engineering Pohang University of Science and Technology; Jun. 24, 2013; pp. 1-116; Pohang, South Korea.
Satoshi Morita; "Sonic art for intersensory listening experience"; Proceedings of the Electroacoustic Music Studies NetworkConference, Electroacoustic Music Beyond Performance; Jun. 2014; pp. 1-11; Berlin, Germany.
Chafe. C.; "Tactile Audio Feedback"; Proc. Intl. Computer Music Conf.; Sep. 1993; pp. 76-79; Tokio, Japan.
Yao, L. et al.; "Music-touch shoes: vibrotactile interface for hearing impaired dancers." Proceedings of the 4th International Conference on Tangible and Embedded Interaction 2010; Jan. 24-27, 2010; pp. 275-276; Cambridge, MA, USA.
Morley, J.W.; "Perceived Pitch of Vibrotactile Stimuli: Effects of Vibration Amplitude, and Implications for Vibration Frequency Coding." J. Physiol.; May 9, 1990; pp. 403-416; vol. 431; Great Britain.
Manresa-Yee, C.; "A Vibrotactile Interface to Motivate Movement for Children with Severe to Profound Disabilities" Proceedings of the XV International Conference on Human Computer Interaction (INTERACCION 2014); pp. 69-72; Aalborg Universitet, Denmark; downloaded on Dec. 18, 2015 from vbn.aau.dk.
Abstract of Ideguchi, T, et al.; "Influence of the Sensation of Vibration on Perception and Sensibility while Listening to Music"; Int J Innov Comput I; Mar. 2009; pp. 631-640; vol. 5 No. 5.
Giordano, M. et al.; "Perceptual and Technological Issues in the Design of Vibrotactile Augmented Interfaces for Music Technology and Media"; Haptic and Audio Interaction Design; vol. 7989 of the series Lecture Notes in Computer Science; pp. 89-98; HAID 2013, LNCS 7989; Springer-Verlag; Berlin Heidelberg.
Papetii, S. et al.; "Multi-point vibrotactile feedback for an expressive musical interface"; Proceedings of the International Conference on New Interfaces for Musical Expression; May 31-Jun. 3, 2015; pp. 235-240; Baton Rouge, LA, USA.
Gunther, E. et al. "Cutaneous Grooves: Composing for the Sense of Touch"; Journal of New Music Research; 2002; pp. 1-13; vol. 31 No. 1.
Nanayakkara, S.C, et al.; "Enhancing Musical Experience for the Hearing-impaired using Visual and Haptic Displays"; Jan. 2012; pp. 1-42; Human-Computer Interaction; vol. 28 No. 2.
Abstract of Darrow, A.A.; "The Effect of Frequency Adjustment on the Vocal Reproduction Accuracy of Hearing Impaired Children"; J Music Ther; 1990; pp. 24-33; vol. 27 No. 1.
Abstract of Darrow, A.A.; "The Effect of Vibrotactile Stimuli via the SOMATRON™ on the Identification of Pitch Change by Hearing Impaired Children"; J Music Ther; 1992; pp. 103-112; vol. 29 No. 2.
Abstract of Darrow, A.A. et al.; "The Effect of Vibrotactile Stimuli via the SOMATRON™ on the Identification of Rhythmic Concepts by Hearing Impaired Children"; J Music Ther; 1989; pp. 115-124; vol. 26 No. 3.
Jack Loftus; "Music for Deaf People Headphones Produce "Sound" Through Synesthesia"; GIZMODO; May 5, 2010; downloaded Dec. 17, 2015 from http://gizmodo.com/5551200/music-for-deaf-people-headphones-produce-sound-through-synesthesia.
Abstract of Gu, C. et al,; "Vibrotactile thresholds at the sole of the foot: effect of vibration frequency and contact location"; Somatosens Mot Res; Nov. 25, 2011; pp. 86-93; vol. 28 No. 3-4.
Israr, A. et al.; "Tactile Brush: Drawing on Skin with a Tactile Grid Display"; CHI 2011 • Session: Touch 1: Tactile & Haptics; May 7-12, 2011; pp. 2019-2028; Vancouver, BC, Canada.
Alan Cross; "This is New: Vibrotactile Music"; A Journal of Musical Things; Jun. 20, 2012; downloaded Dec. 18, 2015 from http://ajournalofmusicalthings.com/this-is-new-vibrotactile-music/.
The, Y.H.; "Experiments on the Audio Frequency Response of Shape Memory Alloy Actuators", Jan. 2005.
Karam, M.; "Designing and Experiencing Audio-Tactile Displays"; eTELEMED 2010; Feb. 10-16, 2010; St. Maarten, Netherlands Antilles; downloaded Dec. 18, 2015 from http://wmv.iaria.org/conferences2010/fileseTELEMED10/AudioTactileDisplays.pdf.
Russo, F. A. et al. "Vibrotactile Discrimination of Musical Timbre"; J Exp Psychol Hum Percept Perform; 2012; pp. 822-826; vol. 38 No. 4
Morley, J.W et al.; "Perceived Pitch of Vibrotactile Stimuli; Effects of Vibration Amplitude, and Implications for Vibration Frequency Coding"; J. Physiol; 1990; pp. 403-416; vol. 431.
Marshall, M.T. et al.; "Vibrotactile Feedback in Digital Musical Instruments"; Proceedings of the 2006 Conference on New Interfaces for Musical Expression(NIME06); Jan. 2006; pp. 1-4; Paris, France; downloaded Dec. 18, 2015 from http://recherche.ircam.fr/equipes/temps-reel/nime06/procinime2006_226.pdf.
Eric Gunther; "Skinscape: A Tool for Composition in the Tactile Modality"; Thesis Submitted to the Department of Electrical Engineering and Computer Science in partial fulfillment of the requirements for a degree of Masters of Engineering MIT; May 23, 2001; pp. 118; Boston, MA, USA.
Emanuel E, Mahzoun; "Good Vibrations: A vibrotactile aid toward music sensation aiming at helping deaf people"; Thesis presented as part of Degree of Master of Science in Electrical Engineering with emphasis on Signal Processing BTH; May 2013; pp. 61; Blekinge, Sweden.
Jack, R. et al.; "Designing Tactile Musical Devices with and for Deaf Users: a Case Study"; Proceedings of the International Conference on the Multimodal Experience of Music 2015; Mar. 23-25, 2015; pp. 001-007; University of Sheffield, UK.
Lauren Sarah Hayes; "Skin Music: an audio-haptic composition"; Cycling '74: Tools for Sound, Graphics, and Interactivity Project #1065; 2012; Edinburg, Scotland; downloaded Dec. 18, 2015 from https://cycling74.com/projects/skin-music-an-audio-haptic-composition#.WBpOjuErKb8.
Saul Mate-CID; "Vibrotactile Perception of Musical Pitch"; Thesis submitted in accordance with the requirements of the University of Liverpool for the degree of Doctor of Phylosophy, Acoustic Research Unit, School of Architecture; Dec. 2013; pp. 216; Liverpool, UK.
The Soundbeam Project Ltd; "Vibroacoustic products"; 2002; Bristol UK; downloaded Dec. 18, 2015 from http://waves.soundbeam.co.uk/vibroacoustics/.
Birnbaum, D. et al.; "A Systematic Approach to Musical Vibrotactile Feedback"; International Computer Music Association; 2007; pp. 397-404; vol. 2007.
Beaufait, M. et al.; "Soundless Music"; Electrical and Computer Engineering University of Michigan, EECS 452: Digital Signal Processing Design Laboratory; Winter 2012; Poster; Michigan, USA; accessed Dec. 17, 2015 from http://www.eecs.umich.eduicourses/eecs452/Projects/W12/DesignExpoW12/SoundlessMusic_DesignExpoPoster.pdf.
Sujata Gupta; "Music for your Skin"; Jul. 9, 2014; NOVA Next; downloaded from http://www.pbs.org/wabh/nova/next/body/haptic-hearing/.
Matt Kramer; "Vibro Acoustic"; Jul. 22, 2009; Orlando Florida; downloaded Dec. 18, 2015 from http://mattkramersoundhealing.com/.
David Richards Ternes; "Building Large Set of Haptic Icons: rhythm as a design parameter, and between-subjects MDS for evaluation"; Thesis submitted in Partial Fulfillment of the Requirements for the Degree of Master of Science in Computer Science; Aug. 2007; pp. 1-263; The University of British Columbia; Vancouver BC, Canada.
Abstract of Branje, C. et al.; "Playing vibrotactile music: A comparison between the Vibrochord and a piano keyboard"; Int J Hum-Comput St; Apr. 2014; pp. 431-439; vol. 72 Issue 4.
Jonathan Kalan; "Why have so few innovations for deaf people actually made it to market? Jonathan Kalan discovers why and finds hope on the horizon"; BBC Future; Jul. 31, 2013; UK; downloaded Dec. 17, 2015 from http://www.bbc.com/future/story/20130731-helping-the-deaf-to-see-sound.
Kevin Lee; "Mouth-Mounted MP3 Player Lets You Hear Beats Through Your Teeth"; PCWorld; Jun. 1, 2012; downloaded Dec. 17,

(56) References Cited

OTHER PUBLICATIONS 2015 from http://www.techhive.com/article/256652/mouth_pounted_mp3_player_lets_you_hear_beats_through_your_teeth.html.

Renate Copper; "Beethoven, Music and The Deaf: A Brief Consideration of the Works and Struggles of Ludwig Van Beethoven"; Lifeprint.com; ASL University; May 14, 2007; USA; downloaded Dec. 17, 2015 from http://www.lifeprint.com/asl101/topics/beethoven02.htm.

* cited by examiner

SOUND VEST

CROSS REFERENCE

This application claims priority to U.S. Provisional Patent Application 61/994,753, entitled "Sound Vest", filed on May 16, 2014, the content of which is hereby incorporated by reference in its entirety.

TECHNICAL FIELD

This disclosure relates to a wearable vest designed to enable a hearing impaired person to experience sounds of various kinds, including but not limited to music, alarms, and speech.

SUMMARY

An important aspect of the present disclosure is a system that uses vibratory motors to generate a haptic language for music (or other sound) that is integrated into wearable technology. The inventive "sound vest" is intended as an assistive device for the hearing impaired. The disclosed system enables the creation of a family of devices that allow people with hearing impairments to experience sounds such as music or other auditory input to the system. The functionality of the vests could include transforming sound/music input to haptic signals so that users can experience their favorite music in a unique way, and also systems that can recognize auditory cues in the user's everyday environment and convey this information to the user using haptic signals. Such pertinent auditory inputs could include a loud siren, someone calling out the user's name, etc.

DETAILED DESCRIPTION OF ILLUSTRATIVE EMBODIMENTS

As discussed above, the present disclosure relates to a system, or "sound vest", that uses vibratory motors to generate a haptic language for music or other sound that is integrated into wearable technology. A technical challenge to creating such a system is to design a system that decomposes auditory input into control signals that can be streamed out to a network of motors. The present inventors have designed a preliminary system that performs entry-level signal processing techniques on the incoming sound in order to determine the spectral profile of the musical input. The motors are then powered based on the magnitude of the spectral power.

A preliminary design of the system enables the use of up to 64 motors to represent the incoming audio. (A revised design utilizes 64 motors on each of the front and back sides of the vest, for a total of 128 motors. For example, each of M1, M2, M3, and M4 in FIG. 2 could represent up to 16 separate motors, for a total of 64 motors on the front side of the vest 40. A similar network of 64 motors could be deployed on the back side of the vest.) The user's entire torso is utilized to create a tono-topic map of the torso—that is, vibratory motors on the left (L) side of the vest are mapped to the left speaker, vibratory motors on the right (R) side of the vest are mapped to the right speaker, vibratory motors on the bottom of the vest are mapped to low frequencies, and vibratory motors on the top of the vest are mapped to high frequencies.

Figure 1:
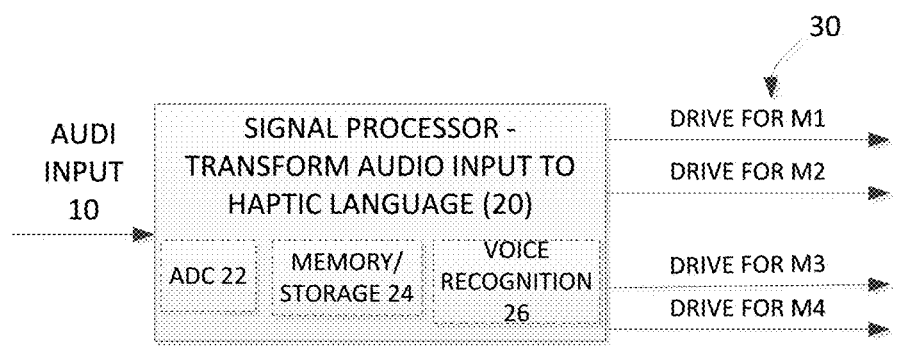
FIG. 1 is a block diagram of an illustrative embodiment of the inventive system.

FIG. 1 depicts the basic system including signal processor (20) that receives audio input (10) (e.g., from a microphone (50, see FIG. 2) or audio jack) and transforms the input audio signal into a haptic language for driving (30) a network of motors denoted M1, M2, M3, and M4. The signal processor may also include an analog-to-digital converter (ADC) (22) for digitizing real-time audio signals provided in analog form, memory or storage (24) for storing audio data, executable instructions, and the like; and a voice recognition module (26).

Figure 2:
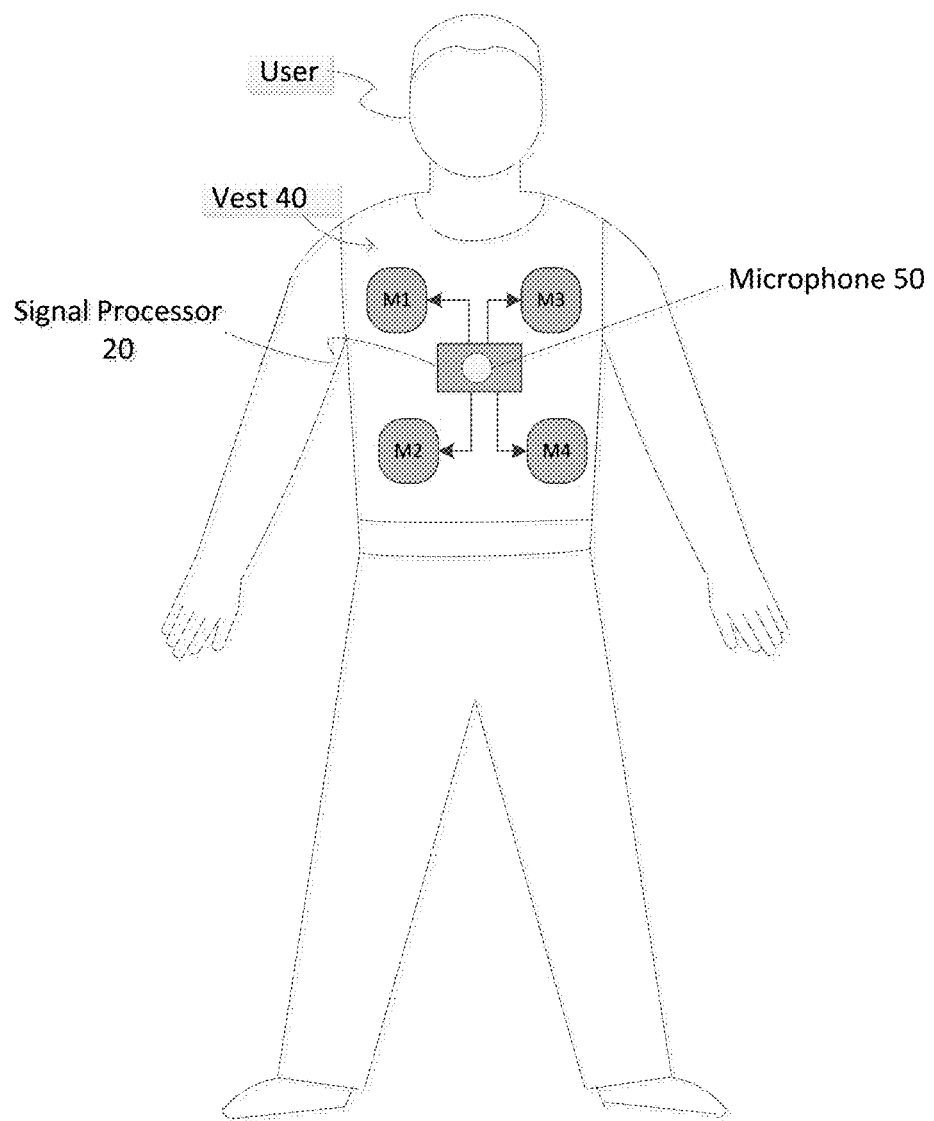
FIG. 2 depicts the inventive system integrated into a wearable vest.

As shown in FIG. 2, the motors M1 through M4 may be integrated into a wearable vest (40) such that M1 and M2 are on the right side of the user's torso and M3 and M4 are on the left side of the user's torso. Moreover, motors M1 and M3 vibrate to represent the higher frequency components of the audio input, whereas motors M2 and M4 vibrate to represent the lower frequency components. It should be understood that in a commercial implementation, there would likely be many more than four motors.

Figure 3:
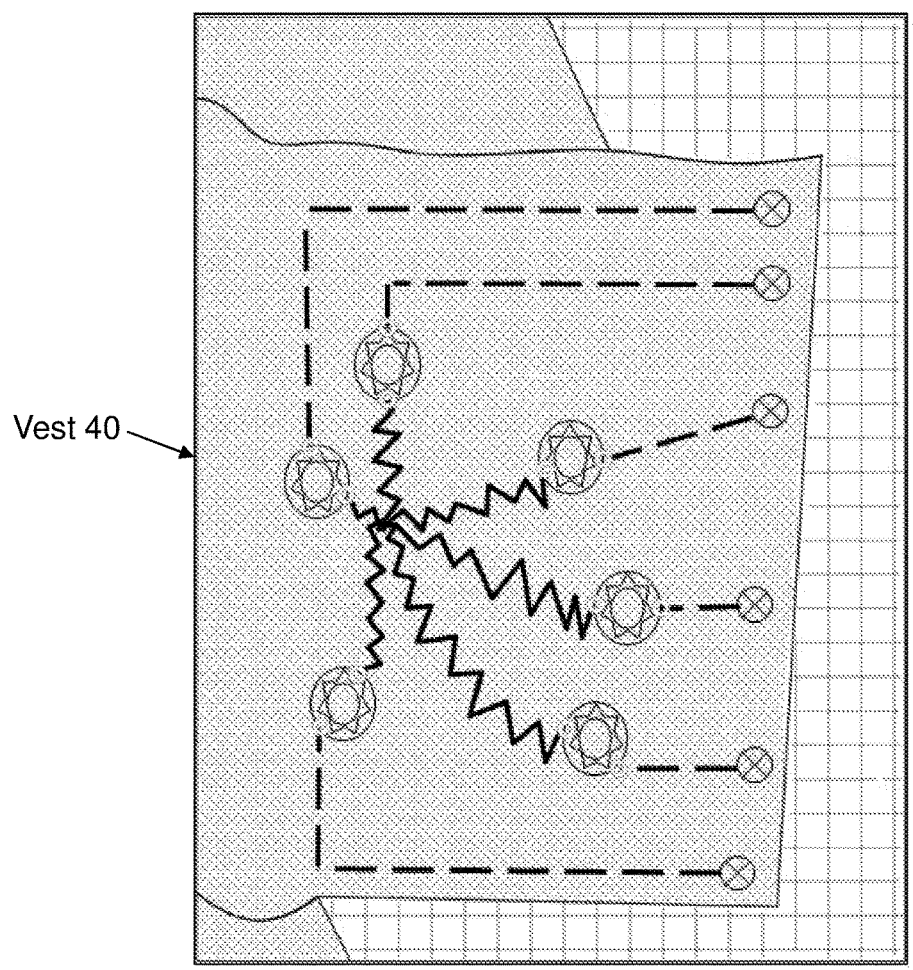
FIG. 3 is a photograph of a prototype in which a network of motors is stitched into a piece of fabric.

As shown in FIG. 3, using conductive thread and relatively low-cost vibratory motors, an initial prototype was made by stitching thread into fabric, as illustrated.

Applicants are aware of information in the public domain relating to wearable technology with haptic feedback. Documents relating to wearable technology with haptic feedback include the following (copies of these are being submitted herewith in an Information Disclosure Statement):

Wojer, http://www.wearabletechworld.com/topics/wearable-tech/articles/361051-woojer-wearable-audio-accessory-that-lets-feel-sound.htm;

https://www.kickstarter.com/projects/1382889335/woojer-feel-the-sound;

https://www.youtube.com/watch?v=svEJ1CgkERM

Wearable speaker vest/jacket:

https://www.google.com/patents/US20090262967?dq=wearable+technology+for+hearing+impaired+to+feel+music&hl=en&sa=X&ei=XIkwU9yXHoe9qAG_oYHgDQ&ved=0CGQQ6AEwBzgK Haptic chair sound enhancing system:

https://www.google.com/patents/WO2010033086A1?cl=en&dq=wearable+technology+for+hearing+impaired+to+feel+music&hl=en&sa=X&ei=c4gwU5CaFonUqgGE1YGwDw&ved=0CDcQ6AEwAA;

https://www.google.com/patents/US8582789?dq=wearable+technology+for+hearing+impaired+to+feel+music&hl=en&sa=X&ei=c4gwU5CaFonUqgGE1YGwDw&ved=OCEUQ6AEwAg Wearable tactile subwoofer and its use:

https://www.google.com/patents/WO2006130559A2?cl=en&dq=wearable+technology+for+hearing+impaired+to+feel+music&hl=en&sa=X&ei=c4gwU5CaFonUqgGElYGwDw&ved=OCEwQ6AEwAw Hey yaa: a Haptic Warning Wearable to Support Deaf People Communication:

http://www.academia.edu/2997186/Hey_yaa_a_Haptic_Warning_Wearable_to_Support_Deaf_People_Communication Gaming: http://www.thebuttkicker.com/gaming/

Some of these translate sound to vibration, but the present disclosure is different in that it goes beyond a simple sensory substitution. The brain is an amazingly "plastic" organ, and we will take advantage of its plasticity by giving the hearing impaired the opportunity to experience music through a haptic "language". This difference lies in the real-time spectral analysis performed as the music streams into the micro-controller at the heart of the sound vest—the audio streams in and is broken down to a representation of its basic frequency components. Then, each frequency domain is sent to a different part of the body (i.e., if the user is listening to Alvin and the Chipmunks, he will feel a lot of vibration up by his collarbones, and not much down low; listen to Barry White, and it will be the other way around due to the dominance of Mr. White's low frequency components). The inventive system can also represent stereo by streaming to the left side of the body for the left speaker and right speaker to the right side.

Further Developments

During the course of further developing the system described above, we have discovered that the process of creating musical sensation though tactile stimuli can be improved in several ways:

1. The audio signals can be improved by converting them into the MIDI (i.e., Musical Instrument Digital Interface) data format, and then reducing the data to a small defined number of tracks, e.g., four (4) tracks representing drums, bass, guitars, and vocal. Other selections could be used as well, depending on the type of music. (Those skilled in the art understand that MIDI is a technical standard that enables a wide variety of electronic musical instruments, computers and other related devices to connect and communicate with one another. A single MIDI link can carry up to sixteen channels of information, each of which can be routed to a separate device.)

2. Instead of mapping the audio signals to the motors as described above (i.e., mapping higher frequencies to the top of the vest and mapping the lower frequencies to the bottom of the vest), it may be advantageous to map each of the 4 tracks to different parts of the vest. For example, the signals corresponding to vocals can be directed to the mid-section while the drums, bass, and guitar signals are directed to respective regions surrounding the mid-section. This mapping has been found to create less cross-over and less "muddiness" to the vibrations created by the motors.

3. If the system is unable to convert live audio to MIDI data in real time, it can be advantageous to provide a mode in which the music data is first downloaded and then played back through the vest. In this way, the user can experience the music albeit not in a real-time, "live" setting.

Figure 4:
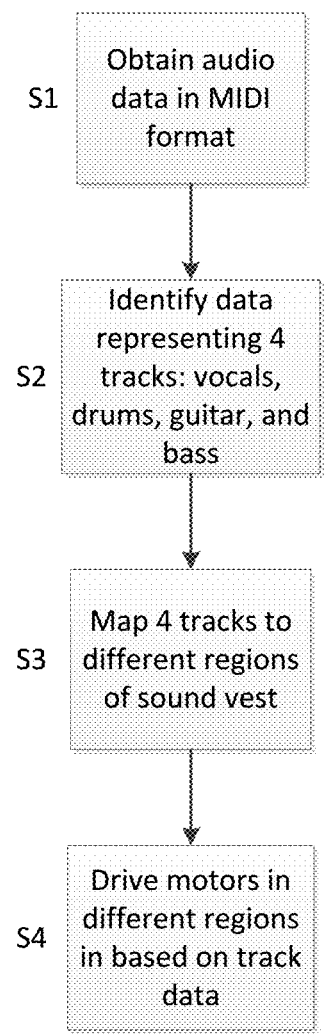
FIG. 4 is a flowchart of an inventive algorithm for converting audio data into signals for driving a network of vibrating motors incorporated into a wearable vest.

As shown in FIG. 4, an inventive algorithm for converting audio data into signals for driving a network of vibrating motors incorporated into a wearable vest comprises the following steps: First, in step S1, audio data in MIDI format is obtained. The data can either be downloaded to the system from a third party provider, or created using recorded audio and an audio production software tool. In step S2, the MIDI data is organized into 4 tracks representing vocals, drums, guitars, and bass. In step S3, the 4 tracks are mapped to different regions of the sound vest; and in step S4 the respective tracks of data are used to drive the motors in the different regions.

Finally, the system may be enhanced by providing wireless links between the signal processor and the motors. In addition, a voice recognition module may be incorporated to enable the system to recognize specific spoken words for selective playback through the motors. For example, the user's name may be specifically recognized and used to signal the user through the motors.

We claim:

1. A system for transforming audio information to a haptic language, comprising:
    a signal processor (20) configured to receive an audio input (10) and simultaneously generate a plurality of electrical driving signals (30) according to a predefined mapping from audio signals comprising portions of said audio input to each of said plurality of electrical driving signals;
    a wearable vest (40); and
    a network of a plurality of vibratory motors (M1-M4) incorporated into the wearable vest, wherein the plurality of electrical driving signals generated by the signal processor are used to drive the plurality of vibratory motors according to a predefined mapping of audio signals comprising portions of said audio input to a plurality of different regions of the vest.

2. A method for transforming audio information to a haptic language expressed through a wearable vest, comprising:
    using a signal processor to receive an audio input and simultaneously generate a plurality of electrical driving signals according to a predefined mapping from audio signals comprising portions of said audio input to each of said plurality of electrical driving signals; and
    using the plurality of electrical driving signals to drive a network of a plurality of vibratory motors incorporated into the wearable vest, wherein the plurality of electrical driving signals are used to drive the plurality of vibratory motors according to a predefined mapping of audio signals comprising portions of said audio input to a plurality of different regions of the vest.

3. The method of claim 2, further comprising transforming the audio data into the plurality of electrical driving signals by obtaining audio data in a prescribed format; organizing the audio data into 4 tracks representing vocals, drums, guitars, and bass; mapping each of the four tracks to one of the plurality of different regions of the vest; and using each of the respective tracks of data to drive the motors in the corresponding region.

4. The method of claim 3, wherein the prescribed format is a MIDI (Musical Instrument Digital Interface) format.

* * * * *